United States Patent [19]

Kimura et al.

[11] Patent Number: 4,868,781
[45] Date of Patent: Sep. 19, 1989

[54] MEMORY CIRCUIT FOR GRAPHIC IMAGES

[75] Inventors: Koichi Kimura, Yokohama; Toshihiko Ogura, Ebina; Hiroaki Aotsu, Yokohama; Mitsuru Ikegami, Ashigarakami; Tadashi Kawabara, Yokohama, all of Japan

[73] Assignee: Hitachi, Ltd., Tokyo, Japan

[21] Appl. No.: 240,380

[22] Filed: Aug. 29, 1988

Related U.S. Application Data

[63] Continuation of Ser. No. 779,676, Sep. 24, 1985, abandoned.

[30] Foreign Application Priority Data

Oct. 5, 1984 [JP] Japan ............................. 59-208266
May 20, 1985 [JP] Japan ............................. 60-105850

[51] Int. Cl.⁴ .......................................... G06F 15/62
[52] U.S. Cl. ................................. 364/900; 364/518; 340/747; 340/734
[58] Field of Search ... 364/200 MS File, 900 MS File, 364/518, 521; 340/703, 721, 724, 734, 745, 747

[56] References Cited

U.S. PATENT DOCUMENTS

| 4,317,114 | 2/1982 | Walker .................... | 340/721 |
|---|---|---|---|
| 4,450,442 | 5/1984 | Tanaka .................... | 340/814 |
| 4,484,187 | 11/1984 | Brown et al. ............ | 340/703 |
| 4,531,120 | 7/1985 | Brownell Jr. et al. ... | 340/723 |
| 4,550,315 | 10/1985 | Bass et al. ............... | 340/703 |
| 4,559,533 | 12/1985 | Bass et al. ............... | 340/724 |
| 4,616,336 | 10/1986 | Robertson et al. ...... | 364/900 |
| 4,639,768 | 1/1987 | Ueno et al. .............. | 358/22 |
| 4,653,020 | 3/1987 | Cheselka et al. ........ | 364/900 |

FOREIGN PATENT DOCUMENTS 3437896 4/1985 Fed. Rep. of Germany .
0208845 12/1983 Japan .
0005339 1/1986 Japan .

OTHER PUBLICATIONS

IEEE Transactions on Software Engineering, vol. 528, No. 2, Mar. 1982, pp. 137-146, "A Local Network Based on the Unix Operating System".

Primary Examiner—Gary V. Harkcom
Assistant Examiner—Randy W. Lacasse
Attorney, Agent, or Firm—Antonelli, Terry & Wands

[57] ABSTRACT

A memory circuit including memory elements on which data read, write and store operations can be arbitrarily performed, the memory elements having a dyadic/arithmetic operation function. In a read/modify/write mode to be executed during a memory cycle and in an interval in which data from the memory elements and data from external devices exist, an operation is executed between external data and the data in the memory elements and the result of such operation is stored during a write cycle, thereby achieving a higher-speed operation.

27 Claims, 20 Drawing Sheets

FIG. I
(PRIOR ART)
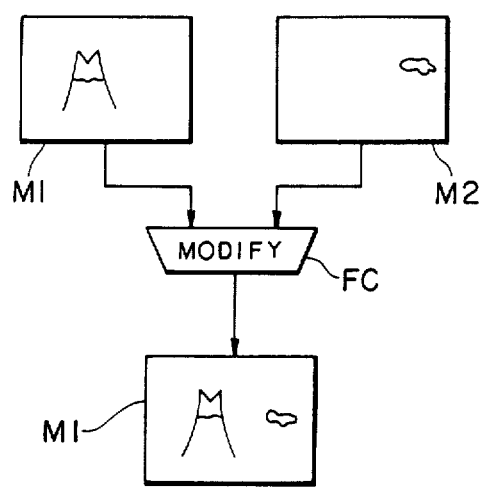
FIG. 2 (PRIOR ART)
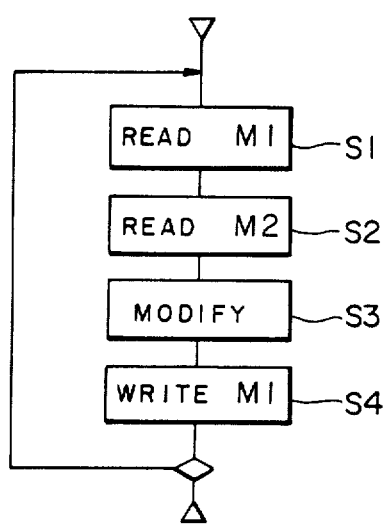

| WRITE MODE | X | Y | Z |
|---|---|---|---|
| MODE I | 0 | — | Y |
| MODE II | 1 | 0 | Do |
|  |  | 1 | $\overline{Do}$ |

| X | Y | Do | Z | WRITE MODE |
|---|---|----|---|------------|
| 0 | 0 | — | 0 | MODE I |
| 0 | 0 | — | 0 | |
| 0 | 1 | — | 1 | |
| 0 | 1 | — | 1 | |
| 1 | 0 | 0 | 0 | MODE II |
| 1 | 0 | 1 | 1 | |
| 1 | 1 | 0 | 1 | |
| 1 | 1 | 1 | 0 | |

FIG. 9

| S0 | S1 | S2 | S3 | X | Y | Z | FUNCTION | REMARKS |
|---|---|---|---|---|---|---|---|---|
| 0 | 0 | 0 | 0 | 0 | 0 | 0 | Zero | |
| 0 | 0 | 0 | 1 | 0 | 1 | 1 | One | |
| 0 | 0 | 1 | 0 | 0 | Di | Di | Pass | |
| 0 | 0 | 1 | 1 | 0 | $\overline{Di}$ | $\overline{Di}$ | NOT | |
| 0 | 1 | 0 | 0 | 1 | 0 | Do | Keep | |
| 0 | 1 | 0 | 1 | 1 | 1 | $\overline{Do}$ | NOT | |
| 0 | 1 | 1 | 0 | 1 | Di | $Di \oplus Do$ | EOR | |
| 0 | 1 | 1 | 1 | 1 | $\overline{Di}$ | $\overline{Di \oplus Do}$ | ENOR | CASE 2 |
| 1 | 0 | 0 | 0 | Di | 0 | $Di \cdot Do$ | AND | |
| 1 | 0 | 0 | 1 | Di | 1 | $Di + Do$ | OR | |
| 1 | 0 | 1 | 0 | Di | Di | $\overline{Di} \cdot Do$ | AND | |
| 1 | 0 | 1 | 1 | Di | $\overline{Di}$ | $\overline{Di} + Do$ | OR | |
| 1 | 1 | 0 | 0 | $\overline{Di}$ | 0 | $Di \cdot \overline{Do}$ | AND | |
| 1 | 1 | 0 | 1 | $\overline{Di}$ | 1 | $Di + \overline{Do}$ | OR | |
| 1 | 1 | 1 | 0 | $\overline{Di}$ | Di | $\overline{Di} \cdot \overline{Do}$ | OR | CASE 1 |
| 1 | 1 | 1 | 1 | $\overline{Di}$ | $\overline{Di}$ | $\overline{Di} \cdot \overline{Do}$ | AND | |

SELECTION OF X
SELECTION OF Y

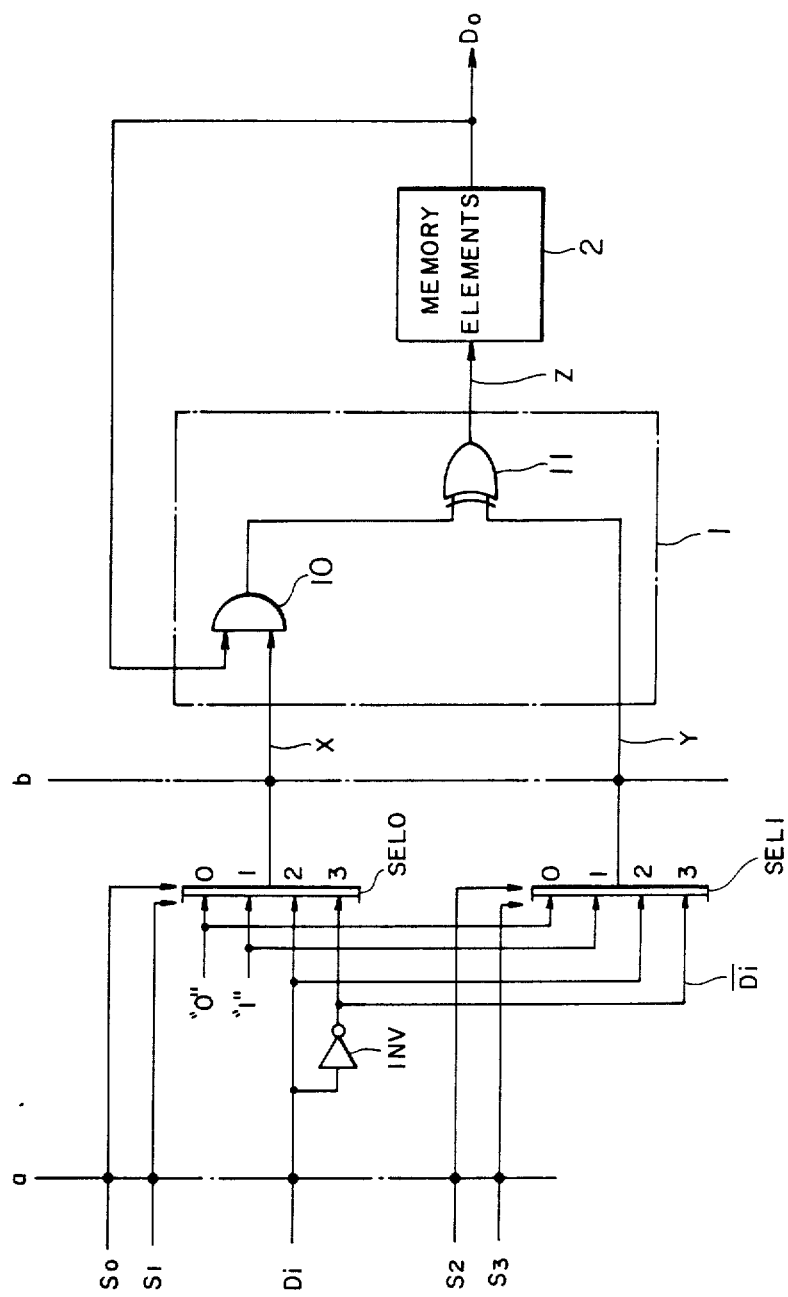

| P | Di'(A) | (B) | S4 | Di |
|---|---|---|---|---|
| 0 | 0 | 0 | 1 | M1 (BACKGROUND) |
|   | 0 | 1 | 1 | M1 |
|   | 1 | 0 | 0 | M2 |
|   | 1 | 1 | 0 | M2 |
| 1 | 0 | 0 | 1 | M1 (BACKGROUND) |
|   | 0 | 1 | 1 | M1 |
|   | 1 | 0 | 0 | M2 |
|   | 1 | 1 | 1 | M1 |

FIG. 20

| CNT | Cr | Y | Z |
|-----|----|----|---|
| 0 | 0 | 0 | Do |
| 0 | 0 | 1 | $\overline{Do}$ |
| 0 | 1 | — | Y |
| 1 | — | — | Y PLUS Do PLUS Cr |

$$Z = \overline{(\overline{CNT} \cdot Cr)} \cdot Y + \overline{(\overline{CNT} \cdot Cr)} \cdot (Y \oplus Do \oplus Cr)$$

$$\overline{P} = \overline{Y \oplus Do + CNT}$$

$$\overline{G} = \overline{Y \cdot Do \cdot CNT}$$

FIG. 23b

| $S_0$ | $S_1$ | $S_2$ | $S_3$ | Z | |
|---|---|---|---|---|---|
| | | | | CNT = 0 | CNT = 1 |
| 0 | 0 | 0 | 0 | Do | Do |
| 0 | 0 | 1 | 0 | $\overline{Do}$ | Do MINUS 1 |
| 0 | 0 | 0 | 1 | Di ⊕ Do | DiPLUS Do |
| 0 | 0 | 1 | 1 | Di ⊕ Do | DoMINUS DiMINUS 1 |
| 1 | 0 | 0 | 0 | 0 | Do PLUS 1 |
| 1 | 0 | 1 | 0 | 1 | Do |
| 1 | 0 | 0 | 1 | Di | DiPLUS DoPLUS 1 |
| 1 | 0 | 1 | 1 | $\overline{Di}$ | Do MINUS Di |
| 0 | 1 | 0 | 0 | $\overline{Di}$ - Do | Do |
| 0 | 1 | 1 | 0 | Di + $\overline{Do}$ | Do MINUS 1 |
| 0 | 1 | 0 | 1 | Di + Do | DiPLUS Do |
| 0 | 1 | 1 | 1 | $\overline{Di}$ · $\overline{Do}$ | DoMINUS DiMINUS 1 |
| 1 | 1 | 0 | 0 | Di · Do | Do PLUS 1 |
| 1 | 1 | 1 | 0 | $\overline{Di}$ + $\overline{Do}$ | Do |
| 1 | 1 | 0 | 1 | Di · $\overline{Do}$ | DiPLUS DoPLUS 1 |
| 1 | 1 | 1 | 1 | $\overline{Di}$ + Do | Do minus Di |

MEMORY CIRCUIT FOR GRAPHIC IMAGES

This application is a continuation of application Ser. No. 779,676, filed Sept. 24, 1985 now abandoned.

BACKGROUND OF THE INVENTION

The present invention relates to a memory element, and particular, to a memory circuit suitable for a graphic memory to be utilized in high-speed image processing.

The prior art technique will be described by referring to graphic processing depicted as an example in FIGS. 1-2. For example, the system of FIG. 1 comprises a graphic area M1 having a one-to-one correspondence with a cathode ray tube (CRT) screen, a store area M2 storing graphic data to be combined, and a modify section FC for combining the data in the graphic area M1 with the data in the store area M2. In FIG. 2, a processing flowchart includes a processing step S1 for reading data from the graphic area M1, a processing step S2 for reading data from the store area M2, a processing step S3 for combining the data read from the graphic area M1 and the data read from the store area M2, and a processing step S4 for writing the composite data generated in the step S3 in the graphic area M1.

In the graphic processing example, the processing step S3 of FIG. 2 performs a logical OR operation only to combine the data of the graphic area M1 with that of the, store area M2.

On the other hand, the graphic area M1 to be subjected to the graphic processing must have a large memory capacity ranging from 100 kilobytes to several megabytes in ordinary cases. Consequently, in a series of graphic processing step as shown in FIG. 2, the number of processing iterations to be executed is on the order of $10^6$ or greater even if the processing is conducted on each byte one at a time.

Similarly referring to FIGS. 2-3, a graphic processing will be described in which the areas M1 and M2 store multivalued data such as color data for which a pixel is represented by the use of a plurality of bits.

Referring now to FIG. 3, a graphic processing arrangement comprises a memory area M1 for storing the original multivalued graphic data and a memory area M2 containing multivalued graphic data to be combined therewith.

For the processing of multivalued graphic data shown in FIG. 3, addition is adopted as the operation to ordinarily generate composite graphic data. As a result, the values of data in the overlapped portion become larger, and hence a thicker picture is displayed as indicated by the crosshatching. In this case, the memory area must have a large memory capacity. The number of iterations of processing from the step S1 to the step S4 becomes on the order of $10^6$ or greater, as depicted in FIG. 2. Due to the large iteration count, most of the graphic data processing time is occupied by the processing time to be elapsed to process the loop of FIG. 2. In graphic data processing, therefore, the period of time utilized for the memory access becomes greater than the time elapsed for the data processing. Among the steps S1–S4 of FIG. 2, three steps S1, S2, and S4 are associated with the memory access. As described above, in such processing as graphic data processing in which memory having a large capacity is accessed, even if the operation speed is improved, the memory access time becomes a bottleneck of the processing, which restricts the processing speed and does not permit improving the effective processing speed of the graphic data processing system.

In the prior art examples, the following disadvantages take place.

(1) In the graphic processing as shown by use of the flowchart of FIG. 2, most of the processing is occupied by the steps S1, S2, and S4 which use a bus for memory read/write operations, consequently, the bus utilization ratio is increased and a higher load is imposed on the bus.

(2) The graphic processing time is further increased, for example, because the bus has a low transfer speed, or the overhead becomes greater due to the operation such as the bus control to dedicatedly allocate the bus to CRT display operation and to memory access.

(3) Moreover, although the flowchart of FIG. 2 includes only four static processing steps, a quite large volume of data must be processed as described before. That is, the number of dynamic processing steps which may elapse the effective processing time becomes very large, and hence a considerably long processing time is necessary.

Consequently, it is desirable to implement a graphic processing by use of a lower number of processing steps.

A memory circuit for executing the processing described above is found in the Japanese Patent Unexamined Publication No. 55-29387, for example.

SUMMARY OF THE INVENTION

It is therefore an object of the present invention to provide a method for storing graphic data and a circuit using the method which enables a higher-speed execution of dyadic and arithmetic operations on graphic data.

Another object of the present invention is to provide a memory circuit which performs read, modify, and write operations in a write cycle so that the number of dynamic steps is greatly reduced in the software section of the graphic processing.

Still another object of the present invention is to provide a memory circuit comprising a function to perform the dyadic and arithmetic operations so as to considerably lower the load imposed on the bus.

Further another object of the present invention is to provide a memory circuit which enables easily to implement a priority processing to be effected when graphic images are overlapped.

According to the present invention, there is provided a memory circuit having the following three functions to effect a higher-speed execution of processing to generate composite graphic data.

(1) A function to write external data in memory elements.

(2) A function to execute a logical operation between data previously stored in memory elements and external data, and to write the resultant data in the memory elements.

(3) A function to execute an arithmetic operation between data previously stored in memory elements and external data, and to write the resultant data in the memory elements.

A memory circuit which has these functions and which achieves a portion of the operation has been implemented with emphasis placed on the previous points.

Also, in many operations other than processing to generate composite multivalued graphic data as described above, a dyadic logic operation is required in which two operands are used. That is, the operation format is as follows in most such cases.

$$D \leftarrow D \text{ op } S;$$

where op stands for operator. On the other hand, the polynomial operation and multioperand operation as shown below are less frequently used.

$$D \leftarrow S_1 \text{ op } S_2 \text{ op } \ldots \text{ op } S_n$$

When the dyadic and two-operand operation is conducted between data in a central processing unit (CPU) and data in the memory elements, memory elements need be accessed only once if the operation result is to be stored in a register of the CPU (in a case where the D is a register and the S is a unit of memory elements). Contrarily, if the D indicates the memory elements unit and the S represents a register, the memory elements unit must be accessed two times. In most cases of data processing including the multivalued graphic data processing, the number of data items is greater than the number of registers in the CPU; and hence the operation of the latter case where the D is the data element unit is frequently used; furthermore, each of two operands is stored in a memory element unit in many cases. Although the operation to access the S is indispensable to read the data, the D is accessed twice for read and write operations, that is, the same memory element unit is accessed two times for an operation.

To avoid this disadvantageous feature, the Read-Mofidy-Write adopted in the operation to access a dynamic random access memory (DRAM) is utilized so as to provide the memory circuit with an operation circuit so that the read and logic operations are carried out in the memory circuit, whereby the same memory element unit is accessed only once for an operation. The graphic data is modified in this fashion, which unnecessitates the operation to read the graphic data to be stored in the CPU and reduces the load imposed on the bus.

In accordance with the present invention there is provided a unit of memory elements which enables arbitrary operations to read, write, and store data characterized by including a control circuit which can operate in an ordinary write mode for storing in the memory elements unit a first data supplied externally based on first data and second data in the memory elements unit, a logic operation mode for storing an operation result obtained from a logic operation executed between the first and second data, and an arithmetic operation mode for storing in the memory elements unit result data obtained from an arithmetic operation executed between the first data and the second data.

BRIEF DESCRIPTION OF THE DRAWINGS

FIG. 1 is a schematic block diagram for explaining an operation to generate a composite graphic image in a prior art graphic data processing system.

FIG. 2 is a flowchart of processing applied to the prior art technique to generate composite graphic data.

FIG. 7 is a schematic circuit diagram for implementing the logic function.

FIGS. 8-9 are tables for explaining truth values in detail.

FIG. 10 is a block diagram depicting the configuration of a memory having a logic function.

FIG. 20 is a table for explaining the operation modes of a control circuit.

FIGS. 23a to 23c are diagrams for explaining an application example of an embodiment.

DESCRIPTION OF THE PREFERRED EMBODIMENTS

Referring the accompanying drawings, the following paragraphs describe embodiments of the present invention in detail.

Figure 4:
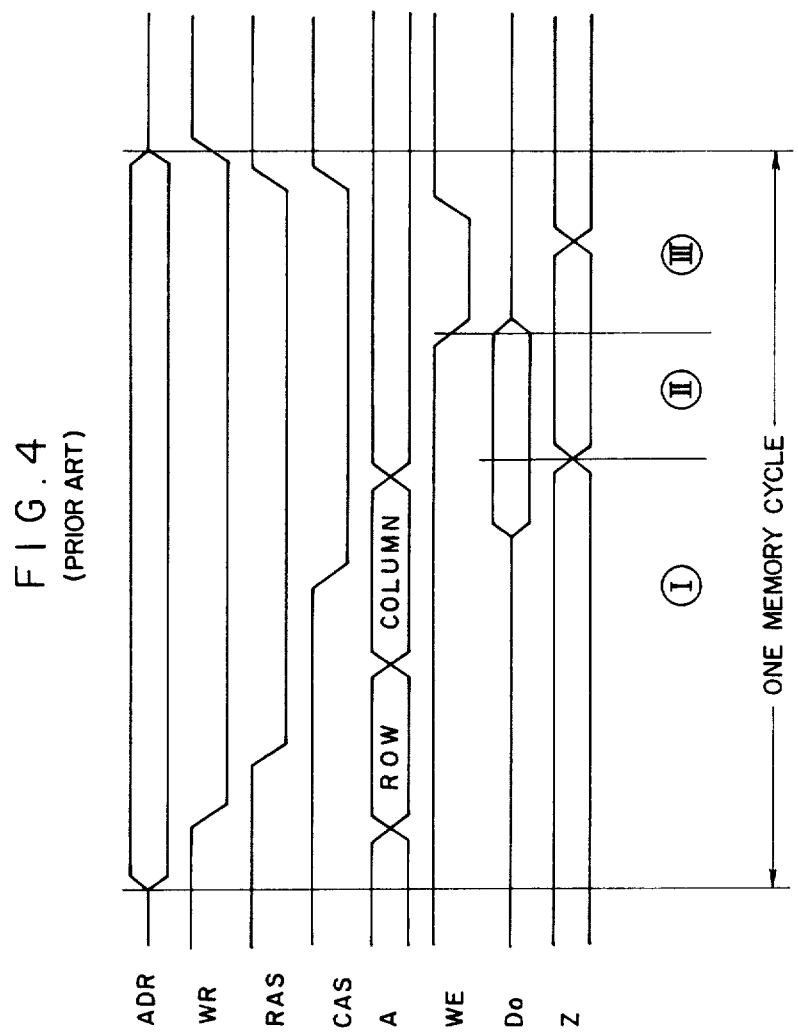
FIG. 4 is a timing chart illustrating the ordinary operation of a memory.

FIG. 4 is a timing chart of a DRAM. First, the operation to access the memory will be briefly described in conjunction with FIG. 4. In this timing chart, ADR is an address signal supplied from an external device and WR indicates a write request signal. These two signals (ADR and WR) are fed from a microprocessor, for example. In addition, RAS is a row address strobe signal, CAS is a column address strobe signal, A indicates an address signal representing a column or row address generated in the timesharing fashion, WE stands for a write enable signal, and Z is a data item supplied from an external device (microprocessor). Excepting the Z signal, they are control signals generated by a DRAM controller, for example. The memory access outlined in FIG. 4 can be summarized as follows.

(i) As shown in FIG. 4, a memory access in a read/write cycle generally commences with a read cycle (①) and ends with a write cycle ( ③ ) due to a write enable signal, WE.

(ii) Between the read cycle (①) and the write cycle ( ③ ), there appears an interval ( ② ) in which a read data Do and an external data Z (to be written) exist simultaneously.

(iii) This interval ( II ) is referred to as the operation enabled interval.

As described above, the store data Do and the external write data Z exist simultaneously in the interval III . As a consequence, the store data Do and the external data Z can be subjected to an operation during a memory cycle in this interval by use of the memory circuit having an operation function, thereby enabling the operation result to be written in the memory circuit.

Figures 5, 6:
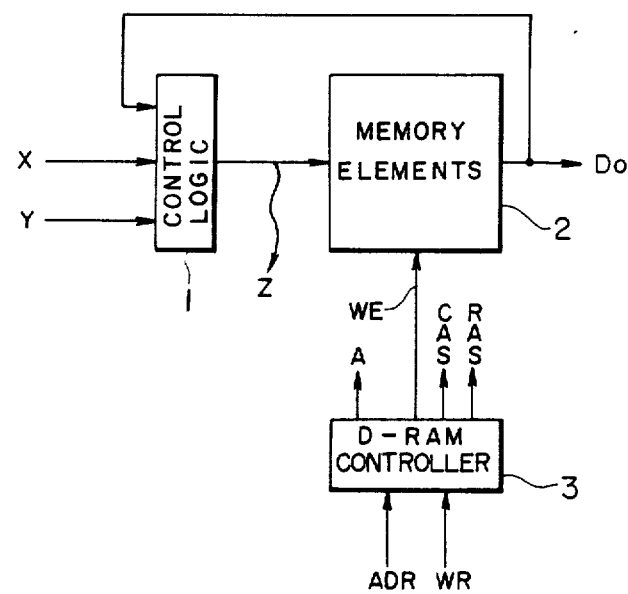
FIG. 5 is an explanatory diagram of a memory having a logic function.
FIG. 6 is a table for explaining the operation modes of the memory of FIG. 5.
Figures 7, 8:
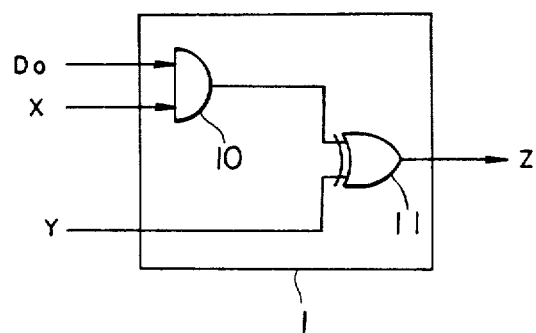

FIG. 5 is a block diagram illustrating a first embodiment of the present invention, FIG. 6 is an explanatory diagram of the operation principle of the embodiment shown in FIG. 5, FIG. 7 is a circuit example implementing the operation principle of FIG. 6, and FIG. 8 is a table for explaining in detail the operation of the circuit shown in FIG. 7.

The circuit configuration of FIG. 5 comprises a control logic circuit 1, a unit of memory elements 2, a DRAM controller 3, external data X and Y, a write data Z to the memory elements unit 2, a read data Do from the memory elements unit 2, and signals A, CAS, RAS, ADR, and WR which are the same as those described in conjunction with FIG. 4. The external data Z of FIG. 4 is replaced with the write data Z delivered via the control circuit 1 to the memory elements unit 2 in FIG. 5.

In accordance with an aspect of the present invention as shown in FIG. 5, the control circuit 1 controls the read data Do by use of the external data signals X and Y, and the modified read data is written in the memory elements unit 2. FIG. 6 is a table for explaining the control operation. In this table, mode I is provided to set the external data Y as the write data Z, whereas mode II is provided to set the read data Do as the write data Z. As shown in FIG. 6, the external data signals X and Y, namely, the external control is used to control two modes, that is, the read data of the memory elements unit 2 is altered and written (mode II), or the external data Y is written (mode I). For the control of two modes, (i) mode I or II is specified by the external data X and (ii) the modification specification to invert or not to invert the read data Do is made by use of an external data.

The control and modification are effected in the interval II described in conjunction with FIG. 4.

A specific circuit example implementing the operation described above is shown in FIG. 7.

The control logic circuit comprises an AND gate 10 and an EOR gate 11 and operates according to the truth table of FIG. 8, which illustrates the relationships among two external data signals X and Y, store data Do, and output Z from the control circuit 1.

As can be seen from FIG. 8, the control circuit 1 operates primarily in the following two operation modes depending on the external data X.

(i) When the external data X is '0', it operates in the operation mode I in which the external data Y is processed as the write data Z.

(ii) When the external data X is '1', it operates in the operation mode II in which the data obtained by modifying the read data Do based on the external data Y is used as the write data Z.

As already shown in FIG. 4, the operation above is executed during a memory cycle.

Consequently, the principle of the present invention is described as follows.

(i) The output Do from the memory elements unit 2 is fed back as an input signal to the control circuit as described in conjunction with FIG. 4; and (ii) The write data to the memory elements unit 2 is controlled by use of the input data signals X and Y (generated from the write data from the CPU) as shown in FIG. 5.

These operations (i) and (ii) are executed during a memory cycle. That is, a data item in the memory elements is modified with an external input data (namely, an operation is conducted between these two data items) during a memory cycle by use of three data items including (i) feedback data from the memory elements, (ii) data inputted from an external device, and (iii) control data from an external device (a portion of external input data is also used as the control data). These operations imply that an external device (for example, a graphic processing system, a CPU available at present, or the like) can execute a logic operation only by use of a write operation.

The operation of the circuit shown in FIG. 7, on the other hand, is expressed as follows $$Z = \overline{X \cdot Do} \, Y + X \cdot Do \cdot \overline{Y} =$$
$$\overline{Do} \cdot Y + \overline{X} \cdot Y + X \cdot Do \cdot \overline{Y} =$$
$$(\overline{X} + X) \cdot \overline{Do} \cdot Y + \overline{X} \cdot Y + X \cdot Do \cdot \overline{Y} =$$
$$\overline{X} \cdot Y + X \cdot (Y \oplus Do) \quad (1)$$

Substituting the externally controllable data items X and Y with the applicable values of a signal "0", a signal "1", the bus data Di fed from the microprocessor, and the reversed data thereof appropriately $\overline{Di}$, the operation results of the dyadic logic operations as shown in FIG. 9 will be obtained. FIG. 10 is a circuit diagram implemented by combining the dyadic operations of FIG. 9 with the processing system of the FIG. 5 embodiment. The system of FIG. 10 comprises four-input selectors SEL0 and SEL1, input select signals S0 and S1 to the selector SEL0, input select signals S2 and S3 to the selector SEL1, and an inverter element INV.

Referring now to FIG. 1 and FIGS. 9-11, an operation example of a logic operation will be specifically described.

As shown in FIG. 9, the input select signals S0 and S1 are used as the select signals of the selector SEL0 to determine the value of data X. Similarly, the input select signals S2 and S3 are used to determine the value of data Y. The values that can be set to these data items X and Y include a signal "0", a signal "1", the bus data Di, and the inverted data thereof $\overline{Di}$ as described before. The selectors SEL0 and SEL1 each select one of these four signal values depending on the input select signals $S_0$ to $S_3$ as shown in FIG. 10. FIG. 9 is a table illustrating the relationships between the input select signals $S_0$ to S3 and the data items X and Y outputted from the selectors SEL0 and SEL1, respectively, as well as the write data Z outputted from the control circuit 1. In graphic processing as shown in FIG. 1 (OR operation: Case 1), for example, the data items X and Y are selected as $\overline{Di}$ and Di, respectively when the input select signals are set as follows: S0, S1=(11) and $S_2$, $S_3$=(10). Substituting these values of X and Y in the expression (1) representing the operation of the control circuit 1, the OR operation, namely, $Z = Di + \overline{Di}$ $Do = Di \cdot (1 + Do) + \overline{Di}$ $Do = Di + (Di + \overline{Di})$ $Do = Di + Do$ is executed. In accordance with an aspect of the present invention, therefore, the graphic processing of FIG. 1 can be performed as shown in FIG. 11 in which the input select signals $S_0$ to $S_1$ are specified in the first step (function specification), a graphic data item to be combined is thereafter read from the storage area M2, and the obtained data item is stored in the graphic area only by use of a write operation.

Various logic functions can be effected by changing the values of $S_0$ to $S_3$ as depicted in FIG. 9. Consequently, an operation to draw a picture, for example, by use of a mouse cursor which is arbitrarily moved can be readily executed as shown in FIG. 12. Even when the mouse cursor (M2) overlaps with a graphic image in the graphic area M1 as illustrated in FIG. 12, the cursor must be displayed, and hence a function of the EOR operation is necessary. In this cursor display, when the input select signals are set as S0, S1=(10) and S2, S3=(01), the processing can be achieved as depicted in FIG. 11 in the same manner as the case of the composite graphic data generation described before. The various logic functions as listed in the table of FIG. 9 can be therefore easily implemented; furthermore, the Read-Modify-Write operation on the memory element unit 2 can be accomplished only by a write operation.

By use of the circuit configuration of FIG. 10, the dyadic logic operations of FIG. 9 can be executed as a modify operation to be conducted between the data Di from the microprocessor and the read data Do from the memory elements unit 2. Incidentally, the input select signals are used to specify a dyadic logic operation.

Figure 11:
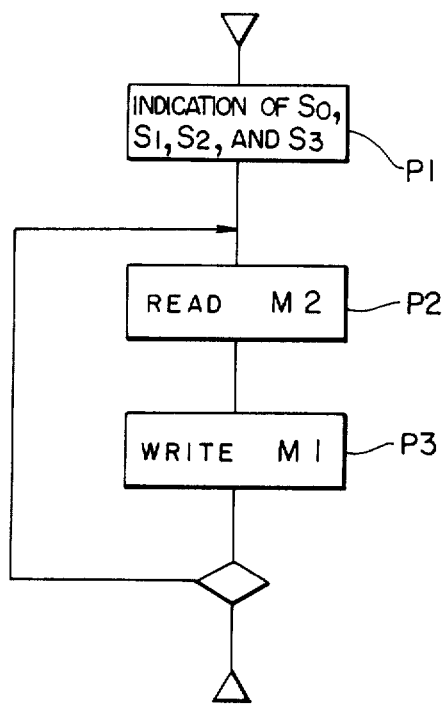
FIG. 11 is a flowchart of processing to generate composite graphic data by use of the memory of FIG. 10.
Figure 12:
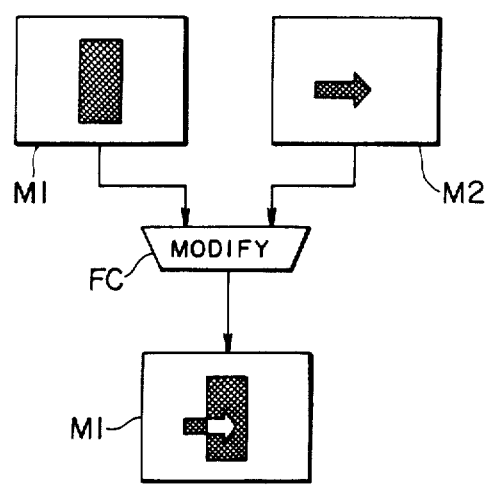
FIG. 12 is an explanatory diagram of processing to generate composite graphic data by use of n EOR logic function.

In accordance with the embodiment described above, the prior art processing to generate a composite graphic image can be simplified as depicted by the flowchart of FIG. 11.

The embodiment of the present invention described above comprises three functions as shown in FIG. 10 namely, a memory section including memory elements unit 2, a control section having the control circuit 1, and a selector section including the selectors SEL∅ and SEL1. However, the function implemented by a combination of the control and selector sections is identical to the dyadic logic operation function described in conjunction with FIG. 9. Although this function can be easily achieved by use of other means, the embodiment above is preferable to simplify the circuit configuration.

Figure 13:
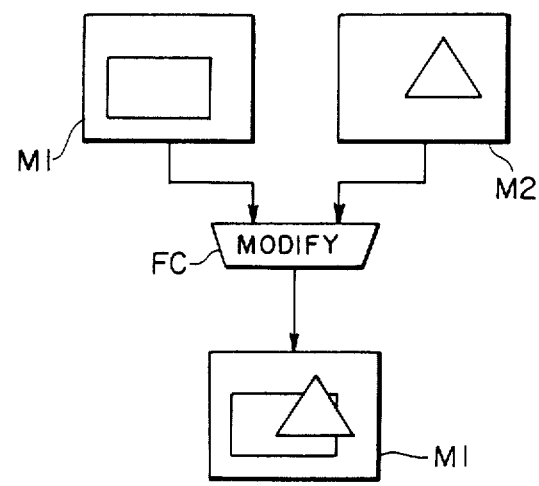
FIGS. 13-14 are schematic diagrams for explaining the processing to generate composite graphic data according to the present invention.
Figure 14:
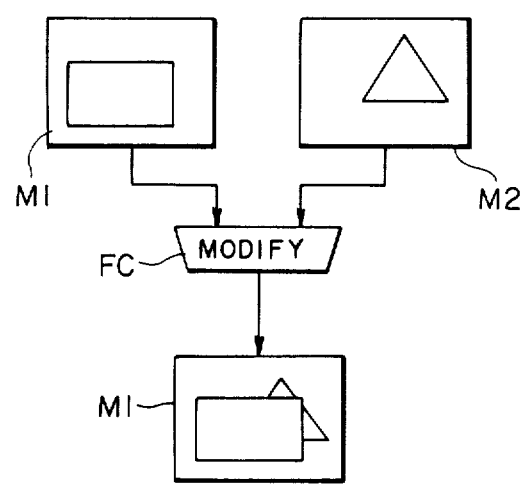

On the other hand, graphic processing is required to include processing in which graphic images and the like are overlapped as illustrated in FIGS. 13-14. In the first case, the graphic image in the store area M2 takes precedence over the graphic image in the graphic image area M1 when they are displayed as depicted in FIG. 13. In the second case, the graphic image in the graphic image area M1 takes precedence over the graphic image in the store area M2 as shown in FIG. 14.

The priority processing to determine the priority of graphic data as illustrated in FIG. 13-14 cannot be achieved only by the logical function (implemented by the FC section of FIG. 10) described above.

This function, however, can be easily implemented by use of the memory circuit in an embodiment of the present invention, namely, only simple logic and selector circuits need be added to the graphic processing system. An embodiment for realizing such a function will be described by referring to FIGS. 15-17. The FC section of FIG. 15 corresponds to a combination of the control circuit and the selectors SEL∅ and SEL1. In this embodiment, the logic operation function (FC) section operates in the pass mode with the input select signals S0 to S3 of the selectors SEL∅ and SEL1 set as (0, 0, 1, 0), for example.

Figure 15:
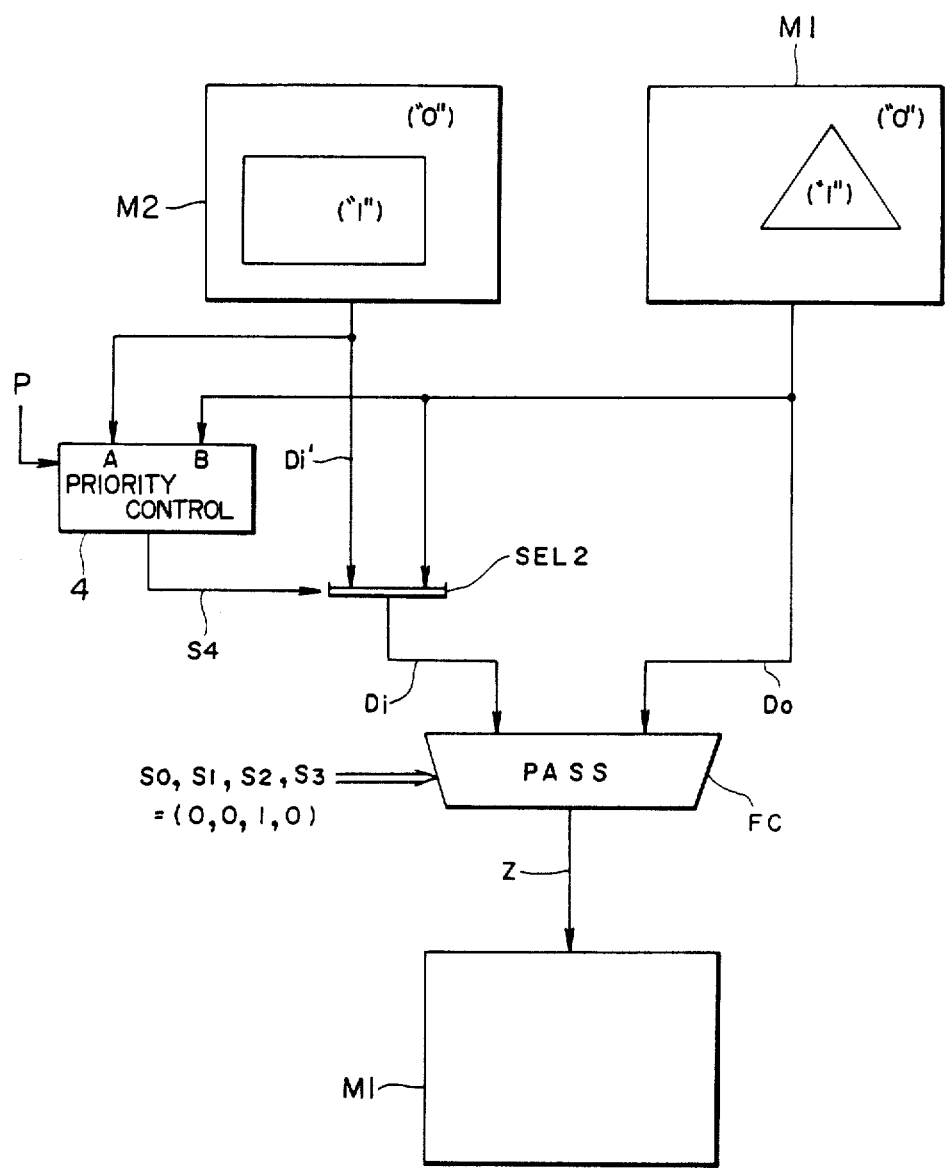
FIG. 15 is an explanatory diagram of an embodiment of the present invention.

The circuit block diagram of FIG. 15 includes a priority control section 4, a two-input selector SEL2, a priority specification signal P, an input select signal S4 to the selector SEL2, a graphic data signal Di' from the store area M2, a graphic image area M1, a selected signal Di from selector SEL2, a graphic data signal Do from the graphic image area M1 (identical to the read data signal from the memory elements unit 2 shown in FIG. 10), and an output signal Z from the FC section (identical to the output signal from the control circuit 1 of FIG. 4). For the convenience of explanation, the graphic area is set to a logic value "1" and the background area is set to a logic value "0" as shown in FIG. 15. In this processing, the priority control section 4 and the selector SEL2 operate according to the contents of the truth table of FIG. 16. The relationships between the input select signal S4 and the input data Di to the logic operation function (FC) section are outlined in FIG. 16, where the signal S4 is determined by a combination of the priority specification signal P, the data Di' in the area M2, and the data Do from the area M1, and the input data Di is set by the signal S4.

In other words, the truth table of FIG. 16 determines an operation as follows. For example, assume that the graphic area to be used as the background is M1. If the data items Do and Di' in the areas M1 and M2, respectively, are set to the effective data ("1"), the priority specification signal P is used to determine whether the data Do of the background area M1 takes precedence (P=1), or the data Di' of the area M2 takes precedence (P=0).

That is, if a graphic image in the store area M2 is desired to be displayed over the graphic image of the graphic area M1, as illustrated in FIG. 13, the priority specification signal P is set to "0". Then, if the graphic data items Di' and Do are in the graphic areas ("1") as depicted in FIG. 15, the data Di' of the store area M2 is preferentially selected by the selector SEL2. If the priority specification signal P is set to "1", the graphic processing is similarly executed according to the truth table of FIG. 16 as shown in FIG. 14.

Figures 16, 17:
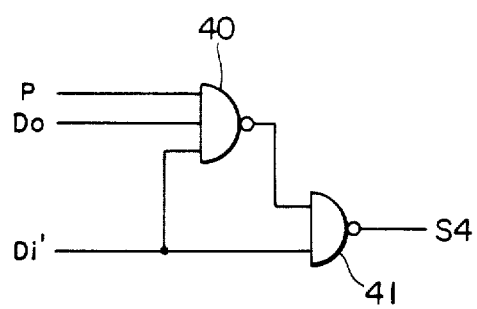
FIG. 16 is a table for explaining in detail the operation logic of the present invention.
FIG. 17 is a schematic circuit diagram of an embodiment of the present invention.

In FIG. 16, if the graphic areas ("1") are overlapped, the graphic area of the graphic area M1, or the store area M2, is selected depending on the priority specification signal P, and the data of the graphic area M1 is selected as the background for the area in which the graphic area does not exist.

FIG. 17 is a specific circuit diagram of the priority control section 4 depicted in FIG. 15. In this circuit diagram, reference numerals 40 and 41 indicate a three-input NAND circuit and a two-input NAND circuit, respectively.

Figure 18:
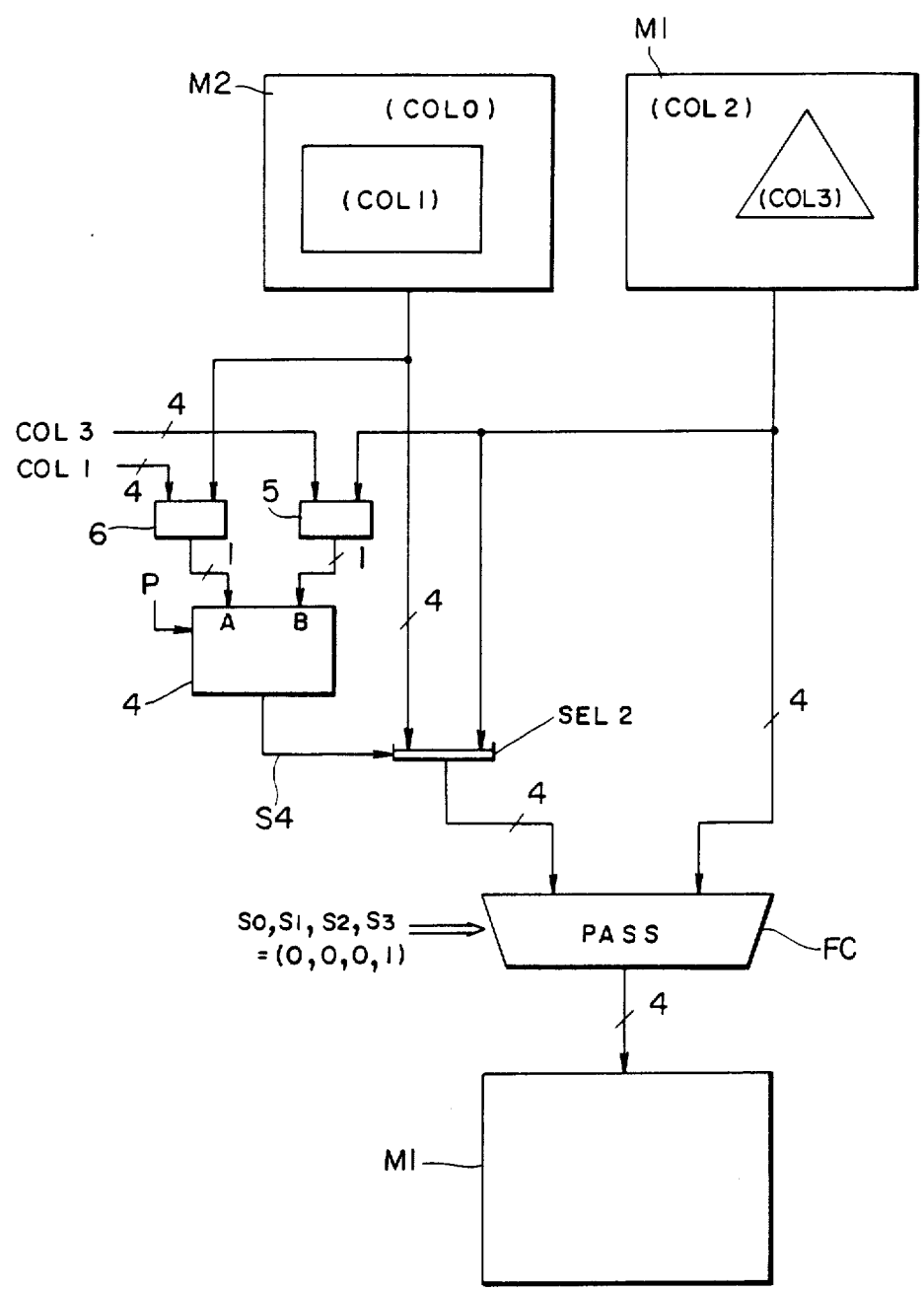
FIG. 18 is a circuit block diagram for explaining an embodiment applied to color data processing.

In order to apply the principle of priority decision to color data in which each pixel comprises a plurality of bits, the circuit must be modified as illustrated in FIG. 18.

The circuit of FIG. 18 includes a compare and determine section 5 for determining the graphic area (COL3) of the graphic area M1 and a compare and determine section 6 for determining the graphic area (COL1) of the store area M1. As described above, the priority determining circuit of FIG. 18 is configured to process code information for which a pixel comprises a plurality of bits. It is different from the circuit for processing information for which a pixel comprises a bit as shown in FIG. 15 in that the priority determination between significant data items is achieved by use of the code information (COL0 to COL3) because the graphic data is expressed by the code information.

Consequently, in the case of color data, the overlapped graphic images can be easily processed by adding the compare and determine sections which determine the priority by comparing the code information.

The preceding paragraphs have described the priority determine circuit applied to an embodiment of the memory circuit having an operation function, however, it is clear that such embodiment can be applied to a simple memory circuit, or a memory circuit which has integrated shift register and serial outputs.

In accordance with this embodiment, the following effect is developed.

(1) When executing the processing as shown in FIG. 1, the processing flowchart of FIG. 11 can be utilized, and hence the memory cycle can be minimized.

(2) Three kinds of processing including the read, modify, and write operations can be executed only during a write cycle, which enables an increase in the processing speed.

(3) As depicted in FIGS. 16–18, the priority processing to be conducted when the graphic images are overlapped can be effected by the use of a plurality of simple logic gates.

(4) The graphic processing of color data can be also easily implemented by externally adding the compare and determine circuits for determining the graphic areas (code data comprising at least two bits).

(5) The size of the circuit configuration necessary for implementing the memory circuit according to the invention is quite small as compared with that of a group of memory elements, which is considerably advantageous to manufacture a large scale integration circuit in the same memory chip.

Figure 3:
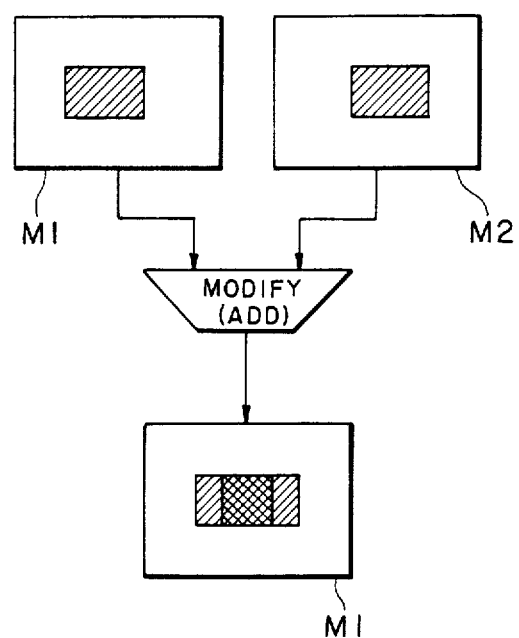
FIG. 3 is a schematic block diagram for explaining multivalued graphic data processing.

Next, another embodiment will be described in which processing to generate a composite graphic data represented as the multivalued data of FIG. 3 is executed.

Figure 19:
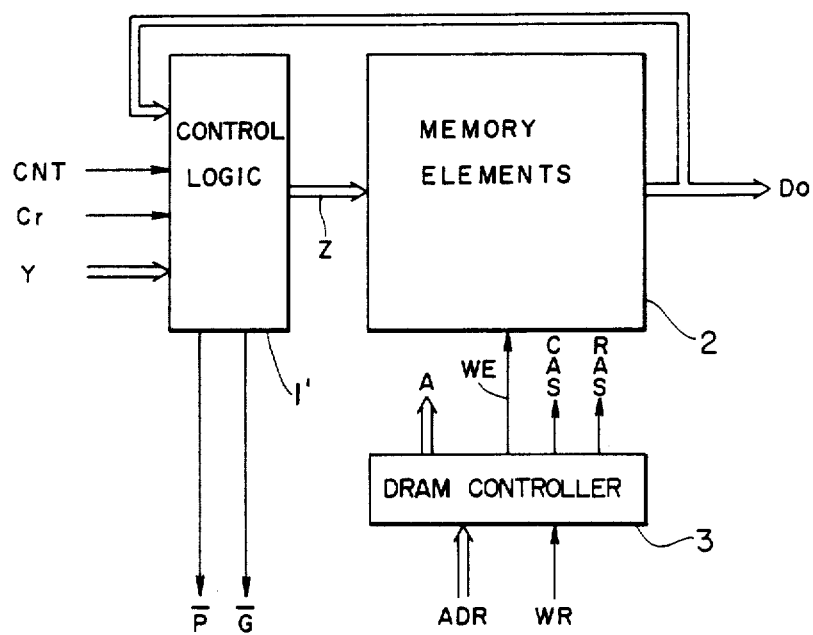
FIG. 19 is a block diagram illustrating a memory circuit of an embodiment of the present invention.

FIG. 19 is a circuit block diagram of a memory circuit applied to a case in which multivalued data is processed. This circuit is different from the memory circuit of FIG. 5 in the configuration of a control circuit 1'.

The configuration of FIG. 19 is adopted because the processing to generate a composite graphic data from the multivalued data indispensably necessitates an arithmetic operation, not a simple logic operation. As shown in FIG. 19, however, the basic operation is the same as depicted in FIG. 5.

In the following paragraphs, although the arithmetic operation is described, the circuit configuration includes the sections associated with the logic operation because the logic operation is also used for the multivalued graphic data processing. The circuit arrangement of FIG. 19 includes a control circuit 1', memory elements unit 2, a DRAM controller 3, external control signals CNT and Cr, data Y supplied from an external device, write data Z to the memory elements unit 2, read data Do from the memory elements unit 2, and signals A, WE, CAS, RAS, ADR, and WR which are the same as those shown in FIG. 5.

In the embodiment as shown in FIG. 19, the control circuit 1' performs an operation on the read data Do and the external data Y according to the external control signals CNT and Cr; and the operation result, write data Z is written in the memory elements 2. FIG. 20 is a table illustrating the control operation modes of the control circuit 1'. When the external control signals CNT and Cr are set to 0, the control circuit 1' operates in a mode where the external data Y is used as a control signal to determine whether or not the read data Do is subjected to an inversion before it is outputted; when the signals CNT and Cr are set to 0 and 1, respectively, the control circuit 1' operates in a mode where the external data Y is outputted without change; and when the signals are set to 1, the control circuit 1' operates in a mode where the read data Do, the external data Y, and the external control signal Cr are arithmetically added.

Figure 21:
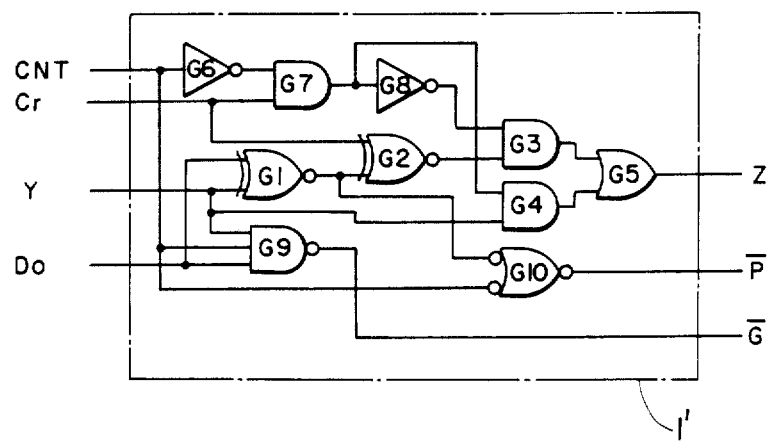
FIG. 21 is a schematic diagram illustrating an example of the control circuit configuration.

FIG. 21 is a specific circuit diagram of a circuit implementing the control operation modes. In this circuit arrangement, the arithmetic operation is achieved by use of the ENOR gates G1 and G2, and the condition that the external control signals CNT and Cr are 0 and 1, respectively is detected by the gates G6 to G8, and the output from the ENOR gate or the external data Y is selected by use of a selector constituted from the gates G3 to G5. This circuit configuration further includes a NAND gate G9 for outputting a generate signal associated with the carry lookahead function provided to minimize the propagation delay of the carry and an AND gate G10 for generating a propagate signal similarly associated with the carry lookahead function. The logical expressions of the output signals Z, $\overline{P}$, and $\overline{G}$ from the control circuit 1' are as listed in FIG. 21, where the carry lookahead signals $\overline{P}$ and $\overline{G}$ each are set to fixed values ($\overline{P}=0$, $\overline{G}=1$) if the external control signal CNT is 0.

Figure 22:
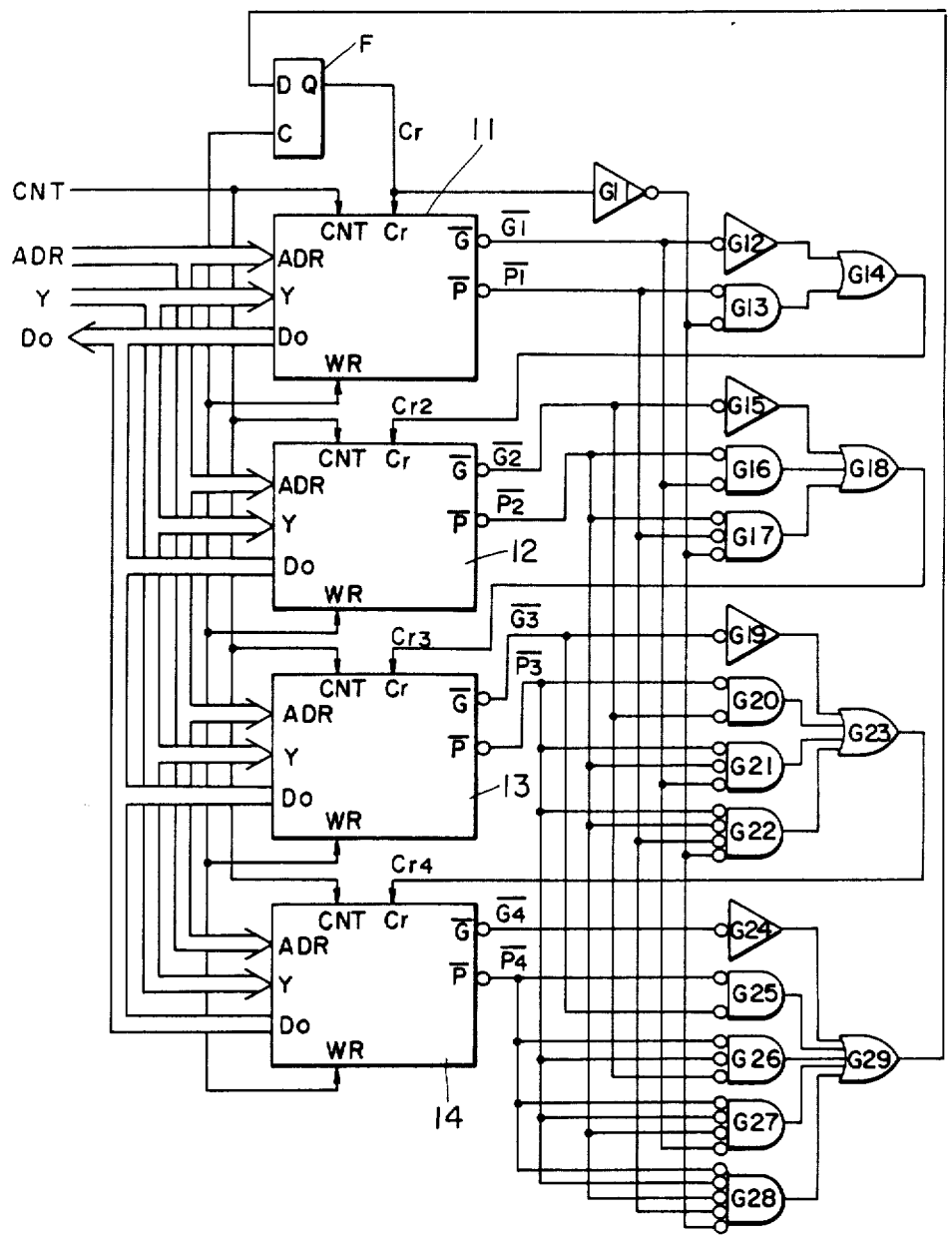
FIG. 22 is a circuit block diagram depicting an example of a 4-bit operational memory configuration.

FIG. 22 is the configuration of a four-bit operation memory utilizing four memory circuits for the embodiment. For simplification of explanation, only the sections primarily associated with the arithmetic operation mode are depicted in FIG. 22. The circuit diagram includes the memory circuits 11–14 shown in FIG. 19, gates G11 to G28 constituting a carry lookahead circuit for achieving a carry operation, and a register F for storing the result of a carry caused by an arithmetic operation. The memory circuits 11 and 14 are associated with the least- and most-significant bits, respectively.

Although not shown in this circuit configuration to simplify the circuit arrangement, the register F is connected to an external circuit which sets the content to 0 or 1. The logical expression of the carry result, namely, the output from the gate G29 is as follows.

$$G4 + G3 \cdot P4 + G2 \cdot P3 \cdot P4 + G1 \cdot P2 \cdot P3 \cdot P4 + Cr \cdot P1 \cdot P2 \cdot P3 \cdot P4$$

When the external control signal CNT is 0, Pi and Gi are set to 1 and 0, respectively (where, i indicates an integer ranging from one to four), and hence the logical expression includes only the signal Cr, which means that the value of the register F is not changed by a write operation. Since the intermediate carry signals Gr2 to Gr4 are also set to the value of the signal Cr, three operation states are not changed by a write operation when the external control signal CNT is 0. If the external control signal CNT is 1, the carry control signals $\overline{P1}$ to $\overline{P4}$ and $\overline{G1}$ to $\overline{G4}$ of the memory circuits 11–14, respectively function as the carry lookahead signals, so an ordinary addition can be conducted.

As shown in FIG. 20, although the control circuit has a small number of operation modes, the operation functions can be increased by selecting the logic value 0, the logic value 1, the write data D to a microprocessor or the like, and the inverted data $\overline{D}$ of the write data D as the inputs of the external control signal Cr and the external data Y.

Figure 23A:
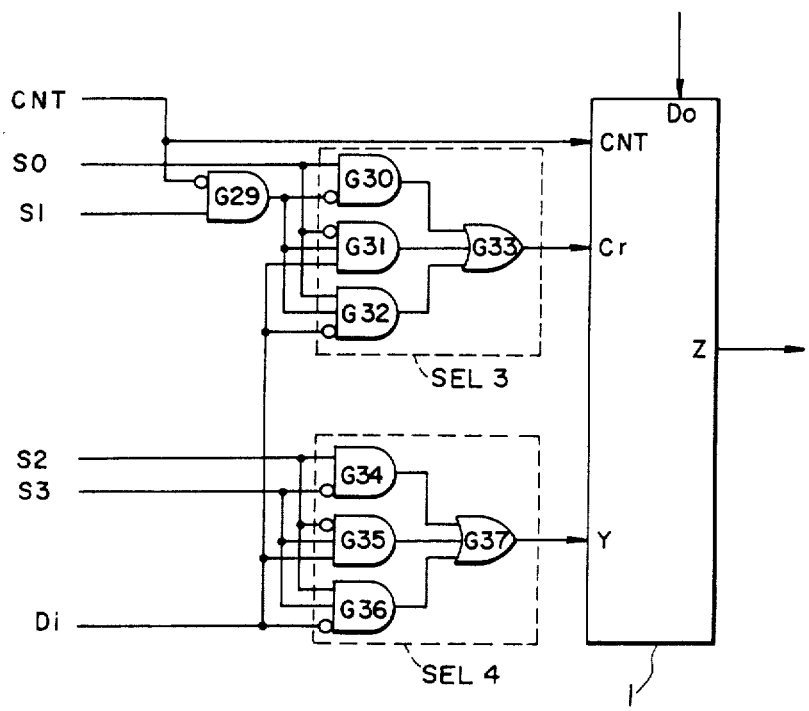
Figure 23C:
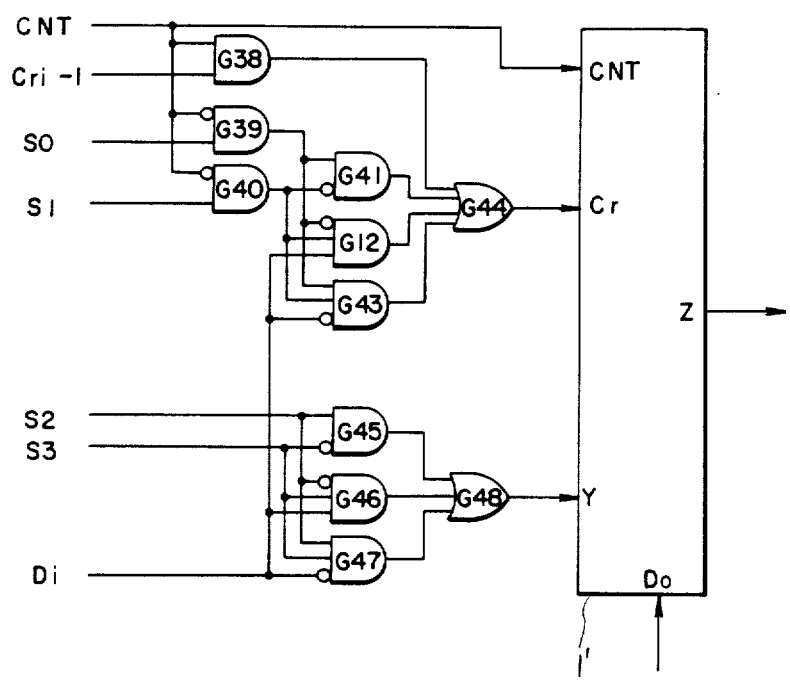

FIGS. 23a to 23c illustrate an example in which the above-mentioned circuits are combined. FIG. 23a is a specific representation of a circuit for the least-significant bit, whereas FIG. 23b is a table outlining the operation functions of the circuit of FIG. 23a.

In the following paragraphs, the circuit operation will be described only in the arithmetic operation mode with the external control signal CNT set to 1.

Figure 24:
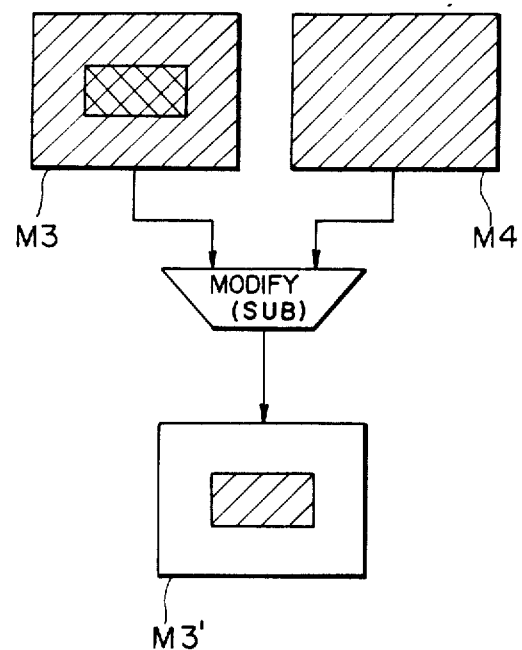
FIG. 24 is a schematic diagram for explaining processing to delete multivalued graphic data.

Gates G29-G33 constitute a selector (SEL3) for the external control signal Cr, while gates G34-G37 configure a selector (SEL4) for the external data Y. The circuit arrangement of FIG. 23a comprises select control signals S0 and S1 for selecting the external control signal Cr and select control signals S2 and S3 for selecting the external data Y. FIG. 23c depicts a circuit for the most-significant bit. This circuit is different from that of FIG. 23a in that the selector for the signal Cr is constituted from the gates G38-G44 so that a carry signal Cri-1 from the lower-order bit is inputted to the external control signal Cr when the external control signal CNT is 1. The selector for the external data Y is of the same configuration of that of FIG. 23a. In the circuit configuration of FIG. 23c, the memory circuit arrangement enables to achieve 16 kinds of logical operations and six kinds of arithmetic operations by executing a memory write access. For example, the processing to overlap multivalued graphic data as shown in FIG. 3 is carried out as follows. First, the select signals S0 to S3 are set to 0, 0, 0, and 1, respectively and the write data Z is specified for an arithmetic operation of Do Plus 1. A data item is read from the multivalued graphic data memory M2 and the obtained data item is written in the destination multivalued graphic data area M1, which causes each data to be added and the multivalued graphic data items are overlapped at a higher speed. Similarly, if the select signals S0 to S3 are set to 1 and the write data Z is specified for a subtraction of Do Minus Di, the unnecessary portion (such as the noise) of the multivalued graphic data can be deleted as depicted in FIG. 24. Like the case of the overlap processing, this processing can be implemented only by executing a read operation on the data memory M3 containing the data from which the unnecessary portion is subtracted and by repeating a write operation thereafter on the destination data memory M3', which enables higher-speed graphic processing.

According to the present invention, (1) The multivalued graphic data processing is effected by repeating memory access two times, and hence the processing such as the graphic data overlap processing and subtraction can be achieved at a higher speed;

(2) Since the data operation conducted between memory units is implemented on the memory side, the multivalued graphic processing can be implemented not only in a device such as a microprocessor which has an operation function but also in a device such as a direct memory access (DMA) controller which has not an operation function; and (3) The carry processing is conducted when a memory write access is executed by use of the circuit configuration as shown in FIG. 22, so the multiple-precision arithmetic operation can be implemented only by using a memory write operation, thereby enabling a multiple-precision arithmetic operation to be achieved at a higher speed.

As can be understood from the foregoing description, the present invention leads to an advantage that the dyadic operation and the arithmetic operation can be performed on graphic data at a higher speed.

In accordance with the present invention, moreover, the priority processing to be utilized when graphic images overlap and processing for color data can be readily implemented.

We claim:

1. A memory circuit formed on an LSI device, comprising:
    (a) memory means for effecting data read, data write and store data operations, and having input means, output means and a plurality of storage locations for storing data; and
    (b) control means having an output connected to said input means of said memory means, and including first data input means, second data input means, third data input means, said second data input means being connected to receive data form said output means of said memory means, and controlling means operating in a first mode to a write data input from said first data input means into said memory means in response to a first value of data received from said third data input means, and operating a second mode to transfer data received from said output means of said memory means via said second data input means to said memory means in inverted form in response to a combination of a first value of data input from said first data input means and a second value of data input from said third data input means and to transfer data received from said output means of memory means via said second data input means to said memory means without modification in response to a combination of a second value of data input from said first data input means and a second value of data input from said third data input means.

2. A memory circuit according to claim 1, wherein said controlling means includes first gate means for gating inputs from said second and third data input means effective to write said data input from said first data input means into said memory and second gate means for gating data input from said first data input means and the output of said first gate means for selectively inverting the data transferred to said memory means according to the value of the data from said first data input means.

3. A memory circuit according to claim 1, further comprising addressing means for addressing a storage location of said memory means where there is stored data to be read out to said output means.

4. A memory circuit according to claim 2, further comprising first selector means and second selector means each for selecting data items from a plurality of data inputs;
    means for applying an output from said first selector means to said first data input means;
    means for applying an output from said second selector means to said third data input means; and
    means for independently controlling said first and second selector means for performing a respective select operation.

5. A memory circuit according to claim 4, wherein said first and second selector means each are provided with four inputs;
    said four inputs including a fixed logic value "0", a fixed logic value "1", a fourth data input the value of which can be arbitrarily changed to be a logic value "0" or "1", and an inverted value obtained by inverting said fourth data input; and said means for independently controlling first and second selector means operating to select one of said four inputs so as to combine the data of said first and third data input means outputted from said selectors, thereby effecting dyadic logic operation.

6. A memory circuit according to claim 1, further comprising:

third selector means for selecting either data from output means of said memory means or said fourth data from an external device in response to a priority control signal; and priority control circuit means from which a priority control signal for controlling said selector is extracted by use of said data from said output means of said memory means, said fourth data from the external device, and a priority specification signal.

7. A memory circuit according to claim 6, wherein:

said fourth data from the external device and said data from the output means of said memory means are subdivided in said memory means into two regions comprising a section having data which is actually to be stored and another section;

said priority control circuit means includes means for controlling said selector means to select said fourth data from the external device when said priority specification signal specifies said fourth data in a processing of said region in which said fourth data from the external device and said data from the output means of said memory means are to be actually stored, to control the selector means to select data from the output means when said priority specification signal specifies said data from the output means in said processing, to control said selector means to select said data from the output means in a processing of a region in which neither said fourth data nor said data from the output means are to be actually stored, to control said selector means to select said fourth data in a processing of a section which only said fourth data is to be actually stored, and to control the selector means to select said data from the output means in a processing of a section in which only said data from the output means is to be actually stored.

8. A memory circuit formed on an LSI device, comprising:

(a) memory means for effecting data read, data write and store data operations, and having input means, output means and a plurality of storage locations for storing data; and (b) control means having an output connected to said input means of said memory means, and including first data input means, second data input means, third data input means, fourth data input means, said second data input means being connected to receive data from said output means of said memory means, and logical operation means operating in a first mode to write data input from first data input means into said memory means in response to a first value of data received from said third data input means, and operating a second mode to transfer data received from said output means of said memory means via said second data input means to said memory means in inverted form in response to a combination of a first value of data input from said first data input means and a second value of data input from said third data input means and to transfer data received from said output means of said memory means via said second data input means to said memory means without modification in response to a combination of a second value of data input from said first data input means and a second value of data input from said third data input means.

9. A memory circuit according to claim 8, wherein said control means further includes arithmetic operation means operating in a third mode for summing the data from said first, second and third input means and for transferring the result of said summing to said memory means in response to a first value of data from said fourth input means.

10. A memory circuit according to claim 9, wherein said first and second modes are discriminated from each other by a control input signal applied to said third data input means from an external device.

11. A memory circuit according to claim 10, wherein said control input signal from an external device is a carry input signal.

12. A memory circuit according to claim 9, wherein said first data and said second data are added with a carry operation in said third mode by said arithmetic operation means.

13. A memory circuit according to claim 12, wherein a result of said addition with a carry operation effected on said second data is outputted to said memory means.

14. A memory circuit according to claim 9, further comprising:

first and second selector means each for selecting a data item from a plurality of input data items, means for applying an output from said first selector means to said first data input means, means for applying an output from said second selector means to said third data input means as a control input signal from an external device, and means for independently controlling said first and second selector means.

15. A memory circuit according to claim 14, wherein input data to said first selector means in said second mode includes said data from an external device and an inverted data thereof, and input data to said second selector means includes 0 and 1.

16. A memory circuit according to claim 9, wherein said first, second and third modes of said control means each are specified by a plurality of control input signals from external devices applied to said third and fourth data input means.

17. A memory circuit according to claim 9, wherein said first, second and third modes of said control means each are specified by two control input signals from external devices applied to said third and fourth data input means.

18. A memory circuit according to claim 17, wherein said first, second and third modes are classified into two kinds of modes by one of said control input signals from external devices.

19. A memory circuit according to claim 18, wherein said two kinds of modes include an ordinary write mode or a logical operation mode and an arithmetic operation mode.

20. A memory circuit according to claim 19, wherein said ordinary write mode is discriminated from said logical operation mode by a control input signal different from said external control input signal specified to discriminate said two kinds of modes.

21. A memory circuit according to claim 18, wherein one of said control input signals from external devices in the arithmetic operation mode is a carry input signal.

22. A memory circuit according to claim 9, wherein said first data and said second data are subjected to an exclusive OR operation as a logic operation in said logic operation mode.

23. A memory circuit according to claim 9, wherein said first data and said second data are added with a carry operation in an operation in said arithmetic operation mode.

24. A memory circuit according to claim 23, wherein a carry result obtained from said arithmetic addition with a carry operation conducted in the arithmetic operation mode is outputted.

25. A memory circuit according to claim 16, further comprising:
   first and second selector means each for selecting a data item from a plurality of input data items,
   means for applying an output from said first selector means to said first data input means,
   means for applying an output from said second selector means to said third data input means as a control input signal from an external device, and
   means for independently controlling said first and second selector means.

26. A memory circuit according to claim 21, wherein said carry input signal is identical to the control signal for discriminating said ordinary write mode from said logic operation mode.

27. A memory circuit formed on an LSI device, comprising:
   (a) memory means for effecting data read, data write, and store data operations, and having input means, output means and a plurality of storage locations for storing data; and
   (d) control means having an output connected to said input means of said memory means, and including first data input means, second data input means, third data input means, fourth data input means, said second data input means being connected to receive data from said output means of said memory means, and arithmetic operation means for summing the data from said first, second and third input means and for transferring the result of said summing to said memory means in response to a first value of data from said fourth input means.

* * * * *